US012697801B2

(12) United States Patent
Bard

(10) Patent No.: US 12,697,801 B2
(45) Date of Patent: Aug. 4, 2026

(54) COATED GLAZING

(71) Applicant: CARLEX GLASS AMERICA, LLC, Nashville, TN (US)

(72) Inventor: Michael Bard, Wadern (DE)

(73) Assignee: CARLEX GLASS AMERICA, LLC, Nashville, TN (US)

( * ) Notice: Subject to any disclaimer, the term of this patent is extended or adjusted under 35 U.S.C. 154(b) by 940 days.

(21) Appl. No.: 17/924,059

(22) PCT Filed: May 27, 2021

(86) PCT No.: PCT/US2021/034473
§ 371 (c)(1),
(2) Date: Nov. 8, 2022

(87) PCT Pub. No.: WO2021/242994
PCT Pub. Date: Dec. 2, 2021

(65) Prior Publication Data
US 2023/0182445 A1 Jun. 15, 2023

Related U.S. Application Data

(60) Provisional application No. 63/031,326, filed on May 28, 2020.

(51) Int. Cl.
*H05B 3/86* (2006.01)
*B32B 17/10* (2006.01)
(Continued)

(52) U.S. Cl.
CPC .. *B32B 17/10229* (2013.01); *B32B 17/10036* (2013.01); *B32B 17/10201* (2013.01);
(Continued)

(58) Field of Classification Search
CPC ........ B32B 17/10036; B32B 17/10201; B32B 17/10229; B32B 17/10293;
(Continued)

(56) References Cited

U.S. PATENT DOCUMENTS 4,465,736 A 8/1984 Nishihara et al.
6,492,619 B1 * 12/2002 Sol ................... B32B 17/10761
52/171.2
(Continued)

FOREIGN PATENT DOCUMENTS

EP 3076753 A1 10/2016
WO 2018/192727 A1 10/2018
(Continued)

OTHER PUBLICATIONS

International Search Report for related International Application No. PCT/US2021/034473; action dated Dec. 2, 2021; (3 pages).
(Continued)

*Primary Examiner* — Sang Y Paik
(74) *Attorney, Agent, or Firm* — K&L Gates LLP

(57) ABSTRACT

A coated glazing useful for vehicles includes a first glass substrate, and a heatable coating formed on the first glass substrate, the heatable coating including at least one heatable layer, at least one dielectric layer, and at least one integrated portion of a heatable layer and a dielectric layer, wherein the integrated portion is formed in a differential heating area of the heatable coating, for variably heating the first glass substrate for deicing wiper park areas or any other heating desirable areas.

20 Claims, 5 Drawing Sheets

(51) Int. Cl.
    *B60J 1/00* (2006.01)
    *C03C 17/36* (2006.01)
    *B60S 1/02* (2006.01)

(52) U.S. Cl.
    CPC .. *B32B 17/10293* (2013.01); *B32B 17/10348*
    (2013.01); *B32B 17/10761* (2013.01); *B32B*
    *17/10788* (2013.01); *B32B 17/10899*
    (2013.01); *B60J 1/001* (2013.01); *B60J 1/002*
    (2013.01); *C03C 17/3644* (2013.01); *C03C*
    *17/3673* (2013.01); *C03C 17/3681* (2013.01);
    *H05B 3/86* (2013.01); *B32B 2307/204*
    (2013.01); *B32B 2307/41* (2013.01); *B32B*
    *2605/006* (2013.01); *B60S 1/026* (2013.01);
    *C03C 2218/32* (2013.01); *H05B 2203/013*
    (2013.01); *H05B 2203/017* (2013.01); *H05B*
    *2203/031* (2013.01); *H05B 2203/037* (2013.01)

(58) Field of Classification Search
    CPC ........ B32B 17/10348; B32B 17/10761; B32B
    17/10788; B32B 17/10899; B32B
    2307/204; B32B 2307/41; B32B
    2605/006; B60J 1/001; B60J 1/002; B60S
    1/026; C03C 17/36; C03C 17/3644; C03C
    17/3655; C03C 17/366; C03C 17/3673;
    C03C 17/3681; C03C 2217/94; C03C
    2218/32; H05B 2203/013; H05B
    2203/017; H05B 2203/031; H05B
    2203/037; H05B 3/86
    USPC ........................................................ 219/203
    See application file for complete search history.

(56) References Cited

U.S. PATENT DOCUMENTS

| | | | |
|---|---|---|---|
| 6,625,875 | B2 | 9/2003 | Sol |
| 6,730,389 | B2 | 5/2004 | Voeltzel |
| 6,870,134 | B2 | 3/2005 | Sol et al. |
| 7,265,889 | B2 | 9/2007 | Morin et al. |
| 8,686,319 | B2 | 4/2014 | Thiel |
| 9,161,393 | B2 | 10/2015 | Kaiserman et al. |
| 9,481,603 | B2 | 11/2016 | Reymond et al. |
| 2017/0226631 | A1 | 8/2017 | Kappertz et al. |
| 2018/0098386 | A1* | 4/2018 | Masschelein ..... B32B 17/10192 |
| 2018/0362400 | A1 | 12/2018 | Streitsov et al. |
| 2019/0375677 | A1 | 12/2019 | Boyce et al. |
| 2020/0039874 | A1* | 2/2020 | Veerasamy ........... C03C 17/366 |
| 2021/0204366 | A1 | 7/2021 | Hagen et al. |

FOREIGN PATENT DOCUMENTS

| | | |
|---|---|---|
| WO | 91/10564 A1 | 4/2019 |
| WO | 2019143597 A1 | 7/2019 |

OTHER PUBLICATIONS

Written Opinion for related International Application No. PCT/US2021/034473; action dated Dec. 2, 2021; (7 pages).

Preliminary Report on Patentability for related International Application No. PCT/US2021/034473; action dated Nov. 17, 2022; (8 pages).

* cited by examiner

COATED GLAZING

CROSS-REFERENCE TO RELATED APPLICATIONS

This application is the National Stage filing under 35 U.S.C. 371 of International Application No. PCT/US2021/034473 filed on May 27, 2021 which claims priority to U.S. Provisional Application No. 63/031,326 filed on May 28, 2020, entitled "Coated Glazing", the entire contents of which are incorporated by reference herein in their entirety.

TECHNICAL FIELD

The present disclosure generally relates to a glazing having a heatable coating with differential heating regions.

DESCRIPTION OF RELATED ART

Glazings, including those which may be used in a vehicle, may include a heatable coating thereon. A heatable coating may be used, for example, to defrost a glazing, including an area where a wiper sits against a windshield. In a vehicle, heatable coatings may be used on any suitable glazing, such as a windshield, rear window, sunroof, or side window. In some glazings, it may be preferable to provide a localized area of increased heating. For example, it may be preferable to heat an area of a windshield adjacent to a wiper more than other parts of the glazing. Increasing heat around such a wiper park area may allow for deicing around the wiper to allow the wiper to function. As a further example, it may be preferable to heat an area of a windshield through which an information acquisition system such as a camera or sensor collects information from outside of a vehicle. Increasing heat around such a camera opening area may allow for defogging where fogging may interfere with the collection of clear information.

SUMMARY OF THE DISCLOSURE

Disclosed herein is a glazing including a first glass substrate, and a heatable coating formed on the first glass substrate, the heatable coating including at least one heatable layer, at least one dielectric layer, and at least one integrated portion of the heatable layer and the dielectric layer, wherein the integrated portion is formed in a differential heating area of the heatable coating.

In some embodiments of the disclosure, the heatable coating may include a single heatable layer and two dielectric layers sandwiching the heatable layer. The integrated portion may include material from the heatable layer and each of the two dielectric layers. In another embodiment, the heatable coating may include first and second heatable layers, with the first heatable layer being sandwiched between a first dielectric layer and a second dielectric layer, and the second heatable layer being sandwiched between the second dielectric layer and a third dielectric layer. The integrated portion may include material of the third dielectric layer and the second heatable layer. in another embodiment, the integrated portion may include material of the first dielectric layer and the first heatable layer. In yet another embodiment, the integrated portion may include material of the first to third dielectric layers and the first and second heatable layers.

The heatable layer may contain silver or a transparent conductive oxide (TCO). The glazing according to this disclosure may further include a second glass substrate laminated to the first glass substrate. The heatable coating may be positioned between the first glass substrate and the second glass substrate. The differential heating area may be an area for a wiper to rest upon the glazing when installed in a vehicle or a peripheral area of a camera opening area. The glazing may further include an opaque print in the differential heating area.

In another aspect of the present disclosure, a method of providing a glazing with a heatable coating, may include the steps of: providing a first glass substrate formed with a heatable coating including at least one heatable layer and at least one dielectric layer; and forming an integrated portion of at least one of the at least one heatable layer and at least one of the at least one dielectric layer in a differential heating area.

In some embodiments of this disclosure, the integrated portion is formed by applying a laser to the heatable coating. The heatable coating may include a single heatable layer and first and second dielectric layers sandwiching the heatable layer, and the integrated portion may be formed from the integration of the single heatable layer with either or both of the first and second dielectric layers. Alternatively, the heatable coating may include first and second heatable layers and first to third dielectric layers, and the integrated portion may be formed from the integration formed of the third dielectric layer and the second heatable layer, the first dielectric layer and the first heatable layer, or the first to third dielectric layers and the first and second heatable layers.

In some embodiment of the disclosure, the method may include a step of laminating the first glass substrate with a second glass substrate. Either or both of the first and second glass substrates may be further formed with an opaque print, and the method for providing a glazing with a heatable coating may include the step of providing the glass substrate further comprising the steps of forming the opaque print on the glass substrate and forming a heatable coating over the opaque print area. The opaque print may be formed on the heatable coating after forming the integrated portion.

In yet another aspect of the present disclosure, a laminated glazing may include a first glass sheet having surfaces Si and S2, wherein Si faces an exterior when installed and a second glass sheet having surfaces S3 and S4, wherein S4 faces an interior when installed, an. Interlayer provided between the first and second glass sheets, a heatable coating formed on either of the first and second glass sheets, the heatable coating including a first heatable region and a second heatable region having a higher heating capability than that of the first heatable region wherein the heatable coating includes at least one heatable layer, at least one dielectric layer and at least one integrated portion of the heatable layer and the dielectric layer, wherein the integrated portion is formed in the second heatable region, a busbar supplying power to the heatable coating, and an opaque print formed on at least one of the first and second glass sheets, the opaque print hiding the busbar and the second heatable region when viewed from an exterior side of the first glass sheet.

In some embodiments of this disclosure, the opaque print may be at least provided on S2, and the busbar and the heatable coating are formed on S3. In some embodiments, the second heatable region may be arranged at a wiper park area. In some embodiments, the heatable coating may be removed to form a camera opening area, and the second heatable region may be formed at a peripheral area of the camera opening area. The heatable layer may contain silver or may contain a transparent conductive oxide (TCO).

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figures 1, 2:
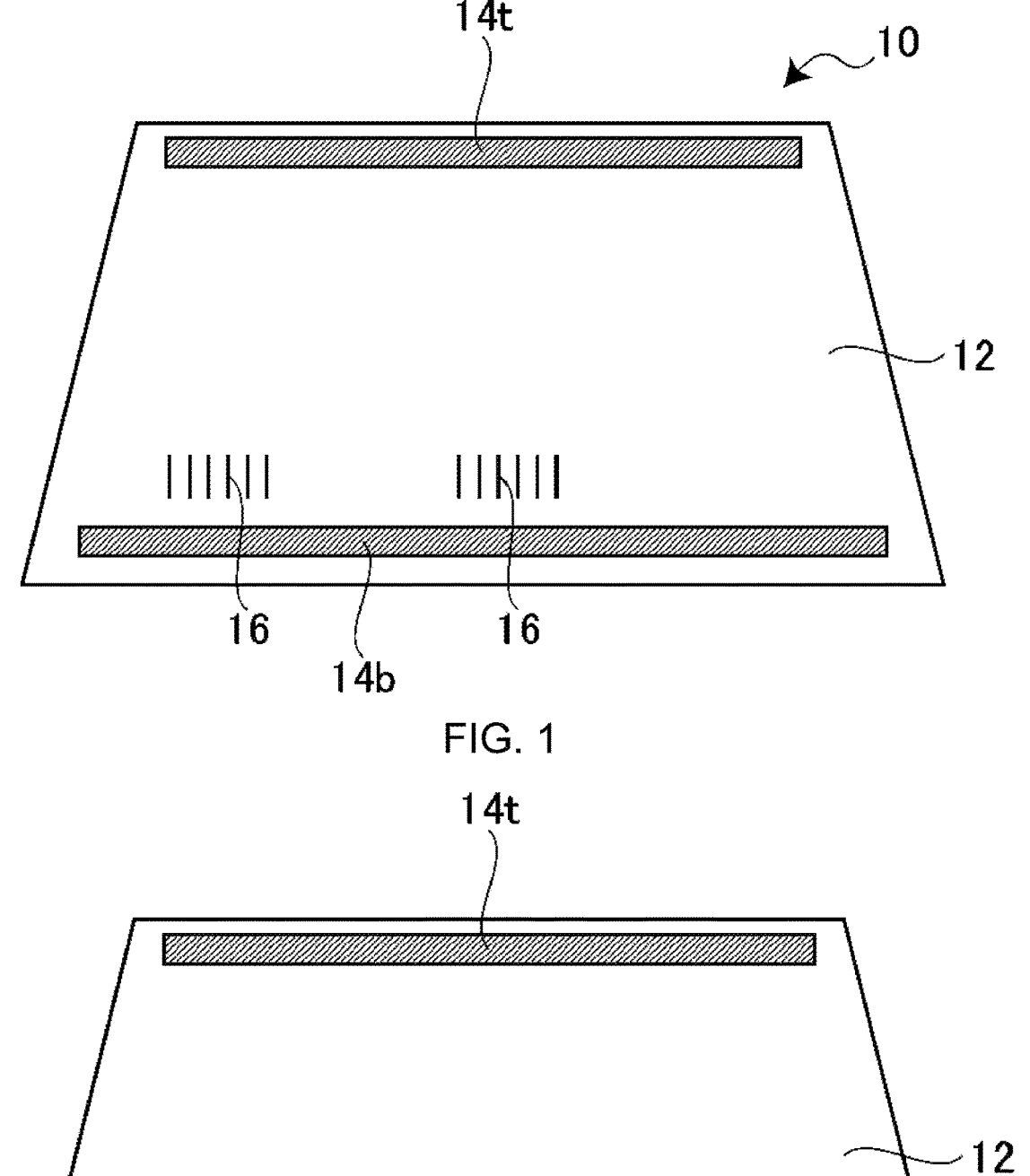
FIG. 1 is a plan view showing a glazing according to an embodiment of the disclosure.
FIG. 2 is a plan view showing a glazing according to an embodiment of the disclosure.

In the following description, for purposes of explanation, specific details are set forth in order to promote a thorough understanding of one or more aspects of the disclosure. It may be evident in some or all instances, however, that many aspects described below can be practiced without adopting the specific design details described below.

Where a heatable coating is functional across an entire windshield, areas of differential heating may be formed with regions separating the coating into electrically isolated portions with separate busbars for each isolated coating area. However, it may be preferable to minimize the number of busbars and electrical connections required. For example, it may be preferable to provide a heatable glazing having two busbars and differential heating across the glazing without requiring electrically isolated portions. In this specification, the terms of "top" and "bottom" designate edges of the glazing respectively when installed in a vehicle.

Heatable coatings may include one or more heatable layers and may include dielectric layers around and between the heatable layers. The heatable layers may be electrically connectable and heated when powered by a power source. A heatable coating may include a metallic coating, such as an infrared reflective coating. The metallic layers may preferably be silver containing layers. The silver containing layer may have a silver content of 90 mass % or more. In particular embodiments described herein, the metallic coating may include at least two metallic layers as the heatable layers, which may be separated by dielectric layers. Example heatable coatings may comprise a sequence of layers as follows: dielectric layer/silver/dielectric layer or dielectric layer/silver/dielectric layer/silver/dielectric layer. The dielectric layers may comprise metal oxides, nitrides or oxynitrides, for example, tin oxide, zinc oxide, silicon nitride, titanium oxide, aluminum oxide or mixtures of one or more thereof. In certain embodiments, a heatable coating may include a transparent conductive oxide (TCO) coating, such as a Low-E coating. A TCO coating may include at least one TCO layer, such as Indium Tin Oxide (ITO) layer(s), as the heatable layers, which may be separated by dielectric layers. The thickness of a metallic layer may be from 1 nm to 100 nm, preferably 5 nm to 50 nm, more preferably 8 nm to 30 nm. The thickness of a dielectric layer may be 1 nm to 100 nm, preferably 5 nm to 50 nm, more preferably 8 nm to 30 nm. The thickness of a TCO layer may be from 1 nm to 200 nm, preferably 10 nm to 1.50 nm, more preferably 20 nm to 100 nm. The heatable coating, having any suitable heatable layers, may be provided in a laminated glazing. Preferably, the heatable coating may be on a glass surface within the laminated glazing. The visible light transparency of the glazing or the laminated glazing may be 70% or more, preferably 72% or more, to satisfy regulatory requirements. Visible light transparency may particularly be determined by ISO 3538:1997, "Road vehicles—Safety glazing materials—Test methods for optical properties." To measure light transmission across a wavelength spectrum or at a particular wavelength, any suitable equipment complying with the ISO standard may be used, such as a UV-Vis Spectrophotometer (e.g., U4000, Hitachi High-Tech Science).

A laminated glazing may include a first glass substrate and a second glass substrate laminated together with an interlayer material therebetween. The thickness of the glass substrates is not particularly limited, but is preferably from 0.5 mm to 3.0 mm. The glass substrates may include, without limitation, soda-lime silicate glass described by ISO 16293-1:2008. In some embodiments, the first glass substrate may be an exterior glass substrate facing a vehicle exterior when the glazing is installed, and the second substrate may be an interior glass substrate facing a vehicle interior when the glazing is installed. Alternatively, the first glass substrate may be an interior glass substrate and the second glass substrate may be an exterior glass substrate, depending on the desired location of a coating.

Particularly, an interlayer may be a polymer adhesive, such as polyvinyl butyral (PVB), ethylene vinyl acetate (EVA), or an ionomer. A heatable coating may be formed on a glass substrate prior to lamination. In the laminated glazing, the heatable coating may be protected from corrosion due to exposure to external elements. In some embodiments, the coating may be deleted around an edge of the glass substrate. The heatable coating may be connected to a power source via busbars formed on the coating. Preferably, the coating includes two busbars formed opposite each other, such that an electrical current may pass across the coating between the busbars. The busbars may be made, for example, by printing a conductive paste on a coating formed on a glass substrate, in particular by the screen-printing method, which may be fired, for example, during bending of the glass substrate. The busbars may, for example, be implemented as strip-shaped or band-shaped electrodes. The busbars may include a thin, narrow metal foil strip of copper or aluminum, for instance, that may include a conductive adhesive layer, applied with electrical contact to the heatable coating. The adhesive foil strip may be attached over a conductive paste material formed on the heatable coating.

Where it is preferable to variably heat the coating, such as for a wiper park area, the coating according to the present disclosure may include integrations of at least a heatable layer and a dielectric layer, which may include as fused or mingled portions of the heatable layer and the dielectric layer. In such areas, the heatable layer may be discontinuous between the dielectric layers.

The integrations, or intermixed areas, of the heatable layer(s), may locally increase resistance in the coating such that the amount of heat generated by ohmic resistance heating in the coated area around the integrations increases to enable faster deicing and/or defogging. A local electric current may be reduced from increased resistance due to the integrations. The increased resistance may cause the coating around the integrations to locally heat more than areas of the coating with no integrations. Where the heatable coating may include a single heatable layer and first and second dielectric layers sandwiching the heatable layer, an integrated portion may be formed from the integration of the single heatable layer with either or both of the first and second dielectric layers. Alternatively, where the heatable coating may include first and second heatable layers and first to third dielectric layers in a stacked manner, an integrated portion, or integration, may be made of one or more of the heatable layers and one or more of the dielectric layers. For example, integrated portions may include the third dielectric layer and the second heatable layer, the first dielectric layer and the first heatable layer, or the first to third dielectric layers and the first and second heatable layers. Other combinations of heatable layers and dielectric layers are further possible. In some further embodiments, the heatable coating may include more than two heatable layers and an integrated portion thereof may include an integration of any number of the heatable layers with one or more dielectric layers of the coating.

The integration may be made by application of a laser beam or any other means for inducing a fused or mingled state of the dielectric layer(s) and the heatable layer(s). The integrations may be formed in any suitable shape, such as straight, zigzag, or curved lines. For example, without limitation, integrations may be formed with multiple fused coating lines of 0.1 mm width with intervals of 0.5 mm. Shape, width, length, and/or interval may be varied depending on a purpose/location of heating. The integrations may be produced as lines perpendicular to a substrate edge or hatching lines, or also from parallel or random patterns.

The area of a coating having integrations may be any suitable shape and size. In some embodiments, an area having integrations may extend across all or part of a bottom portion of a glazing. The area having integrations may include multiple areas of integrated, or intermixed, portions. For example, a vehicle may include two wipers positioned on a windshield and a windshield coating may preferably heat areas of the windshield corresponding to each wiper position in a single extended area or in two separate areas corresponding to the separate wiper positions. Through application of a supplied voltage on the two busbars, the heatable coating areas with integrations and without integrations may be heated simultaneously. The coating area around the integrations may heat more than the coating area without integrations. Integrations may be controlled by width, length, and depth. By controlling depth and relative positioning of the integrations, or namely the integrated portions, one area of integrations, or an area of differential heating, may have a local variation in resistance. Where a differential heating area desirably has a gradually changing heat profile, such integration control may be used to provide a gradual differential heating area.

It may be preferable, in some embodiments, for a glazing to include a heatable coating having multiple heatable layers. For example, a coating may include two or three heatable metallic or TCO layers. According to the present disclosure, at least one of the heatable layers of the heatable coating is interrupted, or not continuous, at the integrations, however the integrations retain conductive material therein. Thus, there may not be a complete interruption in heating. By preventing the interruption in heating, heat may be relatively more evenly distributed across the area of the coating having integrations. Further, the design of the integrations may be flexible. For example, the integrations may be wider, compared to a deletion in the coating, as the coating retains conductivity across the entire coating area.

In some embodiments, the integrations may be formed using a laser. The laser may be absorbed by the coating and locally fuse or intermix the heatable layers and the dielectric layers due to an increased temperature from laser radiation. Particularly, a laser may be configured such that the laser strength fuses at least one heatable layer of the coating with the dielectric layer or layers provided therearound. The preferable power and/or focus of a laser may be determined based on the coating materials and the number and thickness of layers to be fused by the laser. After such treatment in the area of an integration, heatable material from the heatable layer remains in the integration, although the heatable layer is not continuous across the integration.

Laser power sources known in the art for laser deletion for an automotive glazing for electric sensor installation may be used. The laser may be defocused compared to a laser setting for a full deletion of the coating to form an integration. For example, equipment producing a pulsed green laser with a wavelength of 532 nm may be used. In some embodiments, a continuous or pulsed infrared laser with a wavelength of 1059-1065 nm may be used. Moreover, power, pulsation and/or frequency may be periodically or non-periodically varied or scanned. Variation of laser focus during scanning with or without a Galvano scanner may be also used. For another example, laser processing technology with spatial phase modulator or holographic optics may be used. The laser processing may include interfering laser beams to create the integration. Interfering lasers may provide a stable, energy efficient system over a focused laser beam. An axicon lens may be used to create the integrations described herein.

For various uses, including for automotive glazings, glass substrates may be thermally treated, including bending and/or tempering. Where the heatable coating is applied to a glass substrate prior to thermal treatment, the integrations may be formed before or after the thermal treatment.

Figures 10, 11:
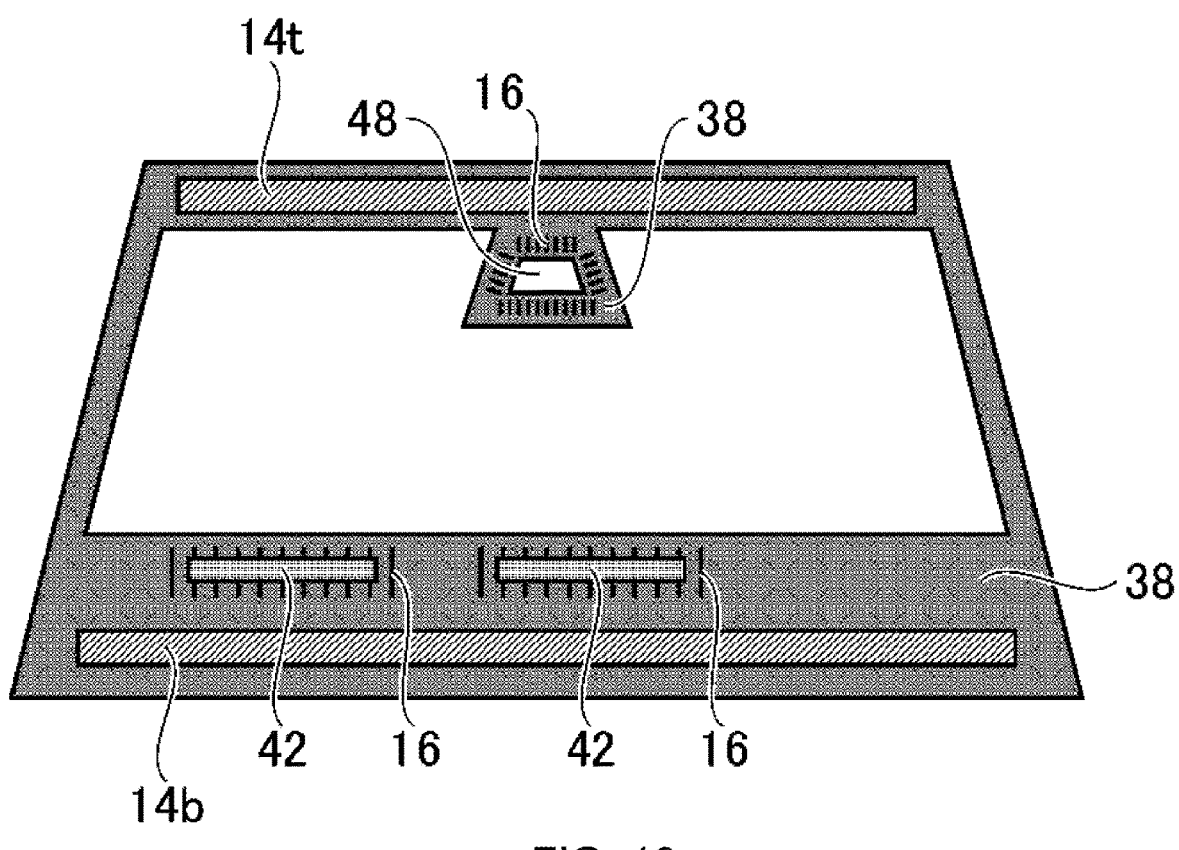
FIG. 10 is a plan view showing a glazing according to an embodiment of the disclosure.
FIG. 11 is a plan view showing a glazing according to another embodiment of the disclosure.

FIG. 1 illustrates a glazing 10 having a heatable coating 12 thereon. The glazing 10 may be suitable for a windshield of a vehicle and may be shaped in a trapezoid form with curving edges, not shown for simple illustration purpose, to fit the frame of the vehicle. Glazings having a coating according to the present disclosure may further be provided having other shapes or purposes, such as for a back window. The heatable coating 12 may be formed on the entire surface of the glass substrate, but the periphery of the heatable coating 12 may be removed in order to prevent corrosion at the edge of the heatable coating. Busbars 14*b*, 14*t* may be positioned opposite each other on the heatable coating 12 so as to provide power to the coating 12. In some embodiments the busbars may be positioned on left and right sides of the coating as shown in FIG. 11 rather than the top and bottom of the coating as shown in FIG. 1. Integrated portions 16 are shown formed in the heatable coating 12 in wiper park areas. The integrated portions 16, as shown, may be provided in more than one area on the glazing. The integrated portions 16 may be formed in areas of the heatable coating 12 where increased heating is desired, including wiper park areas, sensor areas, or camera areas at which cameras are positioned to collect information through the glazing 10.

FIG. 2 illustrates another embodiment of the glazing 10 having a different pattern of the integrated portions 16. In this embodiment, the integrated portions 16 are formed extending along the bottom edge of the glazing and covering wiper park areas.

Figure 3:
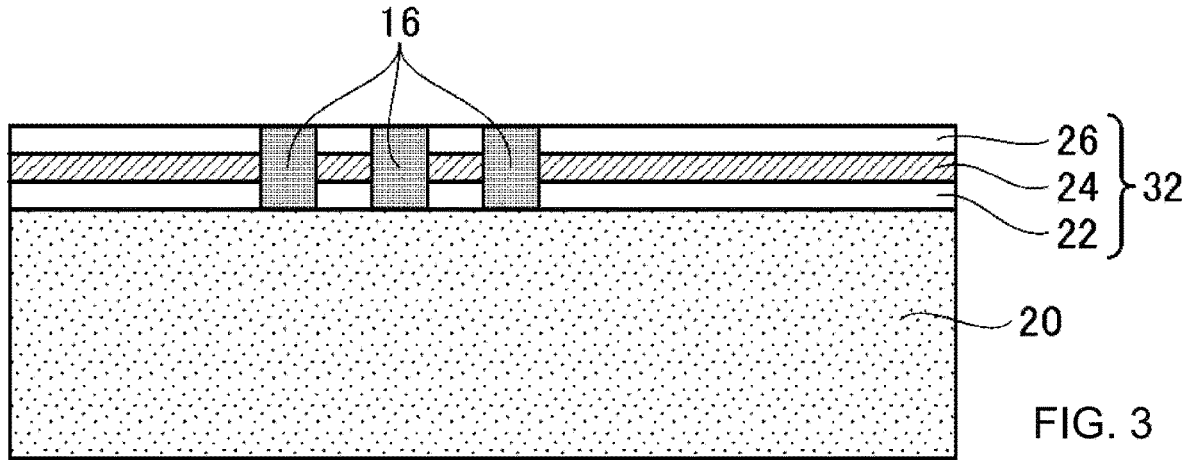
FIG. 3 is a cross section showing a glazing with a differential heating region according to an embodiment of the disclosure.

FIG. 3 to FIG. 6 show variations of integrated portions 16. FIG. 3 shows the integrated portions 16 having a total thickness of a heatable coating 32. In FIG. 3, the heatable coating 32 includes three layers, namely, a first dielectric layer 22, a heatable layer 24, and a second dielectric layer 26, formed in a stacked manner on a first glass substrate 20. As described above, the heatable layer 24 may be formed of silver containing material or any other transparent metal or conductive oxide materials. The dielectric layers 22, 26 may be formed of a material containing metal oxides, nitrides, oxynitrides and the like as main components. The heatable layer 24, and the dielectric layers 22, 26 may be, for example, coated on the glass substrate 20 by a sputtering method. The glazing shown in FIG. 3 has integrated portions 16 foiled by integrating a portion of the dielectric layers 22, 26 and the heatable layer 24. The integrated portions 16 can be in any shape and in any proximity to each other so as to locally increase the electric resistance in the area of the integrated portions, between the two busbars. An example configuration may include integrated portions 1.6 arranged as a series of straight, parallel strips.

Figure 4:
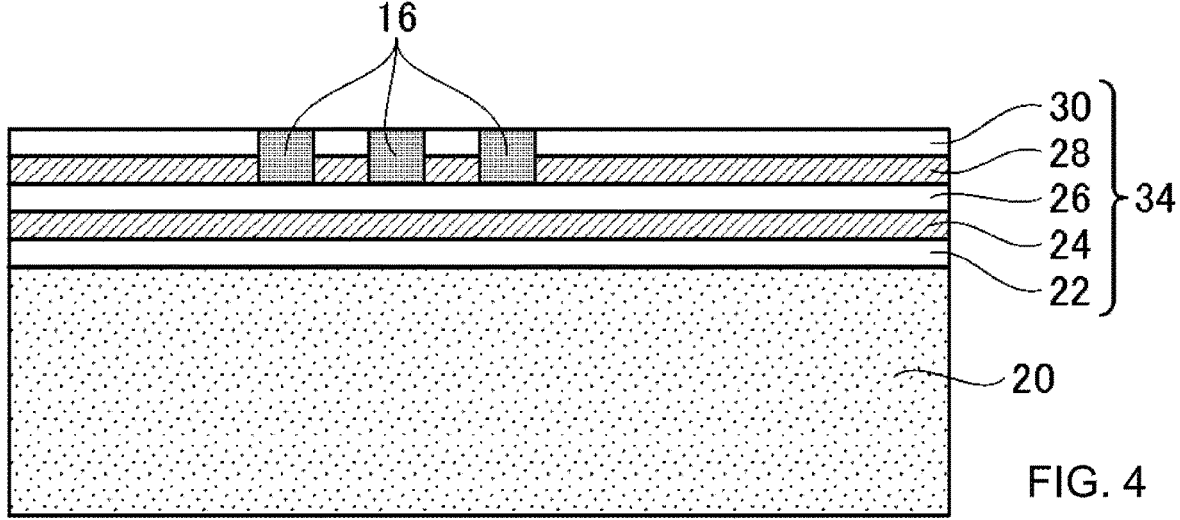
FIG. 4 is a cross section showing a glazing with a differential heating region according to an embodiment of the disclosure.

FIG. 4 shows another embodiment of the glazing 10. In the embodiment shown in FIG. 4, a multilayer heatable coating 34 may be formed on the first glass substrate 20 with five layers 22, 24, 26, 28, 30 in a stacked manner. The five layers may include a first dielectric layer 22, a first heatable layer 24, a second dielectric layer 26, a second heatable layer 28, and a third dielectric layer 30. In FIG. 4, the integrated portions 16 are formed as cross-sectionally extending through the second heatable layer 28 to the third dielectric layer 30. The integrated portions 16 may be in any shape or proximity to each other so as to locally increase the electric resistance and may be arranged, for example, as a series of straight, parallel strips. In some embodiments, the integration portions 16 may include the second dielectric layer 26 in addition to the second heatable layer 28 and the third dielectric layer 30. To folio the integrated portions 16, a laser beam may be radiated from a top side through the third dielectric layer 30.

Figure 5:
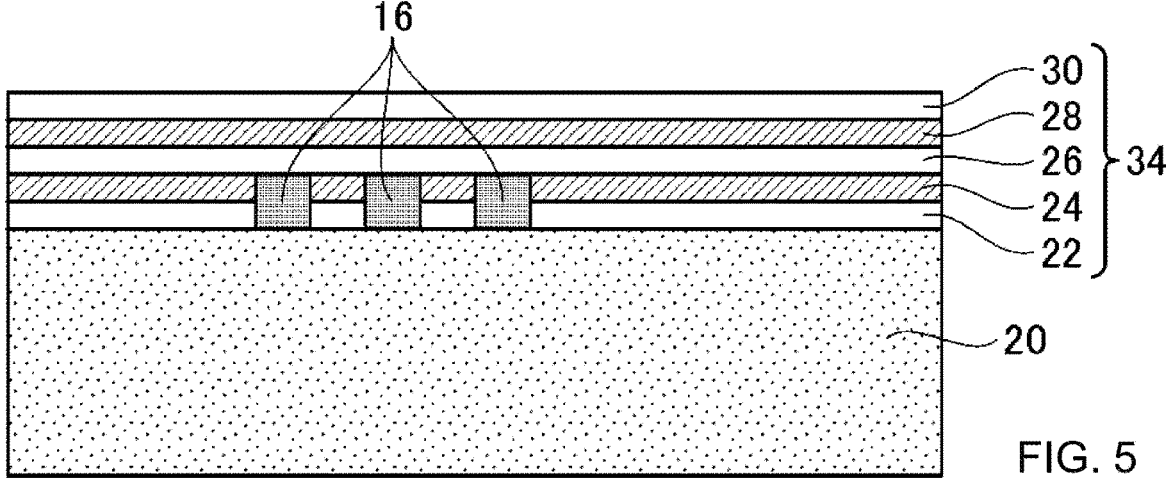
FIG. 5 is a cross section showing a glazing with a differential heating region according to an embodiment of the disclosure.

FIG. 5 illustrates yet another example of the glazing 10. In this embodiment, the multilayer heatable coating 34 having five layers 22, 24, 26, 28, 30 may be formed on the first glass substrate 20 in the same manner as shown in FIG. 4. The five layers may include a first dielectric layer 22, a first heatable layer 24, a second dielectric layer 26, a second heatable layer 28, and a third dielectric layer 30. The integrated portions 16 may be formed as cross-sectionally extending through the first dielectric layer 22 and the first heatable layer 24. In some embodiments, the integration portions 16 may include the second dielectric layer 26 in addition to the first heatable layer 24 and the first dielectric layer 22. The integrated portions 16 may be in any shape or proximity to each other so as to locally increase the electric resistance and may be arranged as a series of straight, parallel strips. With this structure, a laser beam may be radiated from a side of the first glass substrate through the first glass substrate.

Figure 6:
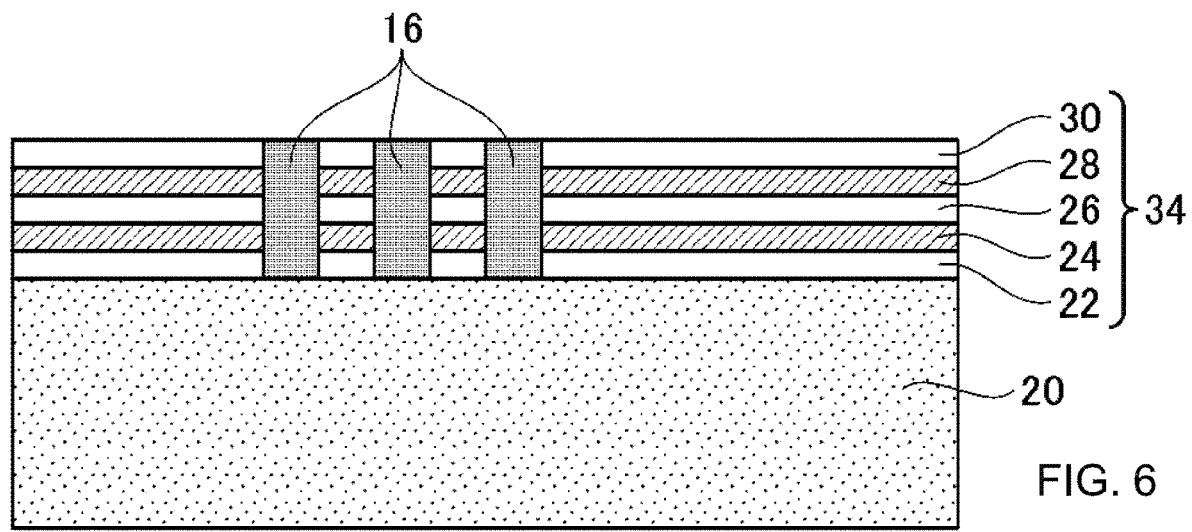
FIG. 6 is a cross section showing a glazing with a differential heating region according to an embodiment of the disclosure.
Figure 7:
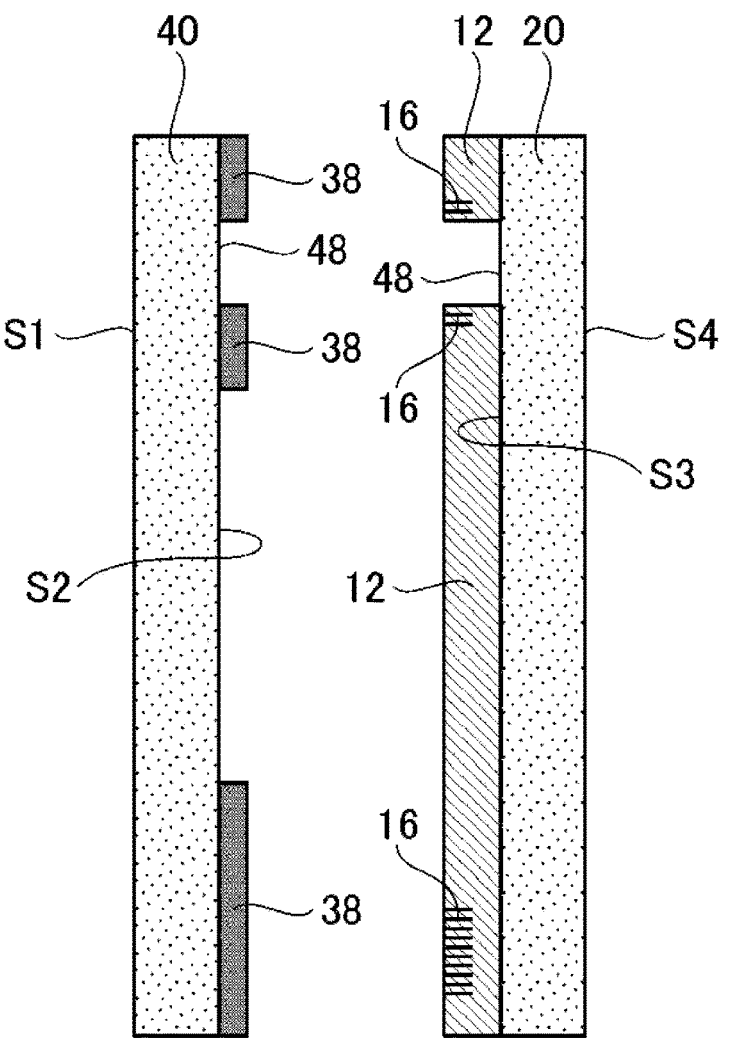
FIG. 7 is a cross section showing a glass sheets for a laminated glazing according to an embodiment of the disclosure.
Figures 8, 9:
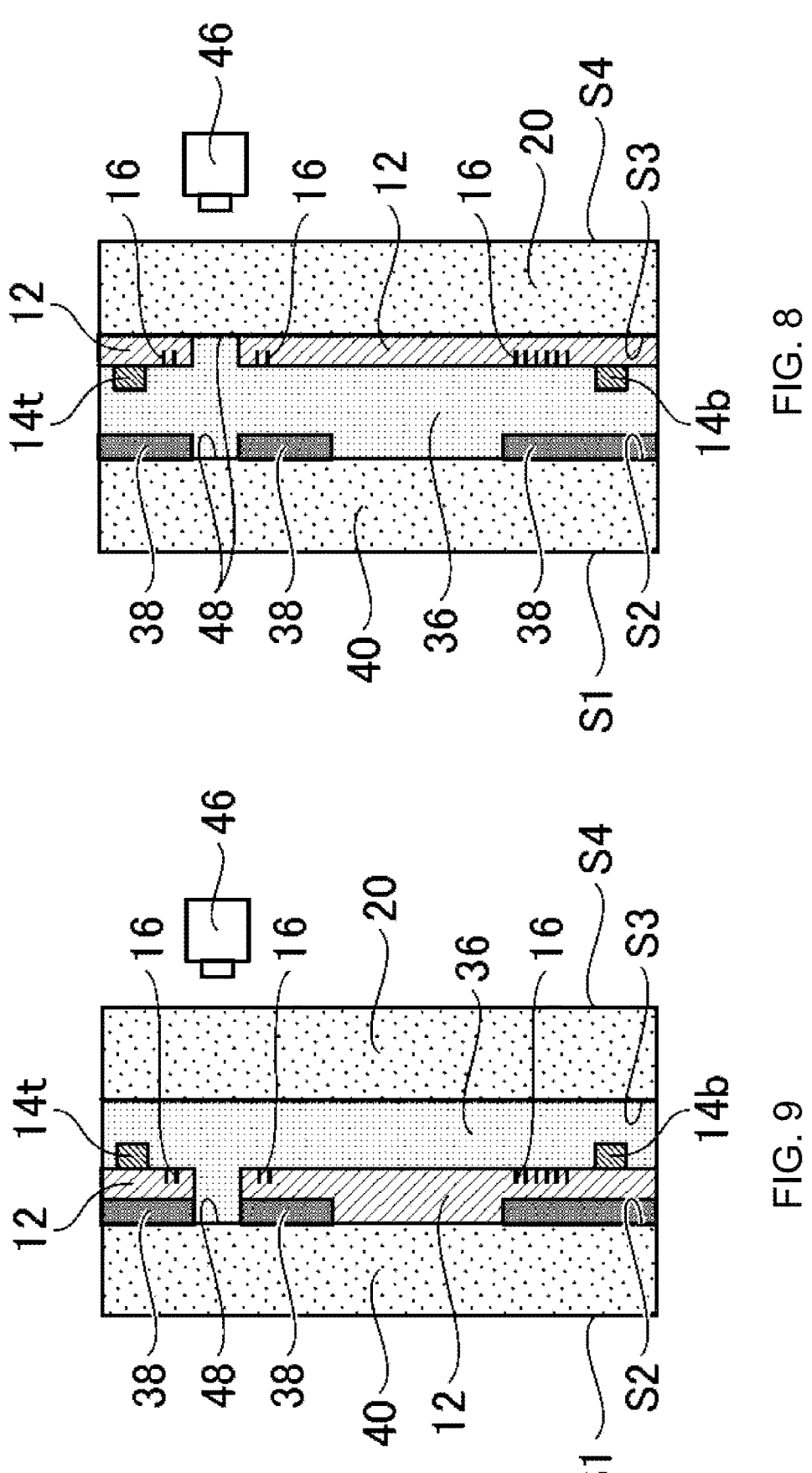
FIG. 8 is a cross section showing a laminated glazing according to an embodiment of the disclosure.
FIG. 9 is a cross section showing a laminated glazing according to an embodiment of the disclosure.

FIG. 6 shows another structure of the integrated portions 16. In this embodiment, the multilayer heatable coating 34 having the five layers 22, 24, 26, 28, 30 may be formed on the first glass substrate 20 in the same manner as shown in FIGS. 4, 5. The five layers may include a first dielectric layer 22, a first heatable layer 24, a second dielectric layer 26, a second heatable layer 28, and a third dielectric layer 30. The integrated portions 16 may be formed as cross-sectionally through all five layers 22, 24, 26, 28, 30 of the heatable coating 34, integrating each of the layers 22, 24, 26, 28, 30. The integrated portions 16 may be in any shape or proximity to each other so as to locally increase the electric resistance and may be arranged as a series of straight, parallel strips.

Where the glazing is a laminated glazing, such as a windshield, the first glass substrate may be laminated with a second glass substrate with an interlayer therebetween. Preferably, the heatable coating may be positioned between the first and second glass substrates in such a laminated construction. FIG. 7 shows a schematic cross section of glass substrates for use in a laminated glazing, including an exterior glass substrate 40 and an interior glass substrate 20. In FIG. 7, the exterior glass substrate 40 has opaque prints 38, and the interior glass substrate 20 has the heatable coating 1.2 having the integrated portions 16 formed from fusing at least one heatable layer and at least one dielectric layer in the heatable coating 12. The exterior glass substrate 40, serving as a first glass sheet, is provided on an exterior side of the windshield, when installed in a vehicle, with an exterior surface S1 and an inner surface S2. The interior glass substrate 20, serving as a second glass sheet, is provided on an interior side of the windshield, when installed in a vehicle, with an inner surface S3 and an interior surface S4 facing the vehicle interior. A black print, or namely an opaque print 38 is formed on the inner surface S2 of the exterior glass substrate 40. The opaque print 38 may be any suitable material, including a black enamel frit, and may be provided on any suitable surface, including a glass substrate surface or a laminated film surface. Particularly, the printing may be provided around a windshield peripheral area including the wiper park areas and a peripheral area of a camera opening area 48. The opaque print 38 may not be formed in the camera opening area. The heatable coating 12 may be completely deleted in the camera opening area so as not to disturb the information collected from outside of a vehicle by the camera. The opaque print 38 may further align with the wiper park areas and may block an exterior view of the intermixed portions 16 in the heatable coating 1.2. A dot pattern area of the opaque print 38 may be formed at an edge of the opaque print 38 at the windshield peripheral area. Opaque prints may be further provided on the interior surface S4. The integrated portions 16 may be arranged near a wiper rest area and a camera opening so that the heat generated around the integrated portions 16 is effectively used for deicing and defogging on the glass substrates 20, 40. The exterior glass substrate 40 and the interior glass substrate 20 may be laminated together as shown in FIG. 8 with an interlayer 36 which may include, e.g., polyvinyl butyral (PVB), ethylene vinyl acetate (EVA), or an ionomer. The integrated portions 16 may be formed in the heatable coating 12 on inner surface S3. The heatable coating 12 may have a multi layer structure as described above, and the integrated portions 16 may be formed in any combination of coating layers, including those shown in FIG. 3 to FIG. 6, or in multiple layer combinations. Multiple combination may include, for example, a heatable coating 12 having one or two heatable layers formed with different combinations of heatable layers and dielectric layers in the integrated portions 16. A heatable coating 12 may preferably include, for example, one, two, or three heatable layers. The integrated portions 16 may create a differential heating area for variably heating the exterior glass substrate 40. Positions of the integrated portions 16 may be designed to correspond to the areas at which differential, or varied, heating application is desirable, such as, e.g., a peripheral area of the windshield, near the wiper park, a peripheral area of a camera opening area, and any other areas that increased heating is suitable. The opaque print 38 may be useful for hiding the busbars 14b, 14t and the integrated portions 16 of the heatable coating 12 when viewed from an exterior side or a side of the surface S1 of the exterior glass substrate 40. Further opaque prints may be provided on the interior surface S4. A camera 46 or other information acquisition system like a sensor or a radar may be arranged near the top of the laminated glazing to collect the information from outside of a vehicle through a camera opening area 48 formed within the opaque print 38. The integrated portions 16 may be formed to provide heat to the peripheral area of the camera opening 48.

FIG. 9 shows another laminated glazing having a similar structure. The laminated glazing has an exterior glass substrate 40 and an interior glass substrate 20, and an interlayer 36 sandwiched by the exterior glass substrate 40 and the interior glass substrate 20. In FIG. 9, the opaque prints 38 and the heatable coating 12 with the integrated portions 16 and the busbars 14 are provided on inner surface S2 of the exterior glass substrate 40. The opaque prints 38 may be formed on the heatable coating 12, and the heatable coating 12 may be formed over the opaque prints 38 in FIG. 9.

FIG. 10 and FIG. 11 show example embodiments of glazings disclosed herein. FIG. 10 illustrates a glazing having busbars 14t, 14b on the top and bottom of the glass structure. FIG. 11 shows the busbars 14s arranged on side edges of the laminated glazing behind the opaque print 38. A pair of wipers 42 are shown in FIG. 10 and FIG. 11 at wiper park areas having integrated portions 16 where the wipers may sit when installed in a vehicle. The integrated portions 16 may provide differential heating in the area, locally heating the heatable coating more than in areas without integrations. On the top side of the laminated glazing, the integrated portions 16 are arranged along a camera opening area 48 to provide heat to deice or defog the camera opening area 48. With this layout, the power is supplied via the busbars 14t, 14b, 14s, thereby generating heat across the windshield with areas of higher heating in the differential heating areas having integrated portions 16. The location of a pair of wipers 42 where they may sit when installed in a vehicle are shown to align with the differential heating area having integrated portions 16. In addition, the integrated portions 16 are shown around the camera opening area 48 to provide heat to the camera opening area 48.

Producing the glazing thus formed with a heatable coating may include the following steps. First, a first glass substrate may be prepared with a heatable coating thereon. The heatable coating may then be treated, such as with a laser, to form integrated portions in the heatable coating.

An opaque print may be formed on a first or second glass substrate. If the opaque print is made on the first glass substrate, the opaque print may be made before or after the formation of the heatable coating.

After forming the integrated portions and opaque print, an interlayer film may be arranged between the first and second glass substrates, which may then be deaired and autoclaved to provide a laminated glazing with the heatable coating having the differential heating area.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A glazing comprising:
   a first glass substrate;
   a heatable coating formed on the first glass substrate, the heatable coating including at least one heatable layer, at least one dielectric layer, and at least one integrated portion of at least one of the at least one heatable layer and at least one of the at least one dielectric layer; and
   at least one busbar formed on the heatable coating and located separate from the at least one integrated portion,
   wherein the integrated portion is formed in a differential heating area of the heatable coating.

2. The glazing according to claim 1, wherein the heatable coating includes one heatable layer and two dielectric layers sandwiching the one heatable layer.

3. The glazing according to claim 2, wherein the integrated portion includes material from the heatable layer and each of the two dielectric layers.

4. The glazing according to claim 1, wherein the heatable coating includes a first heatable layer and a second heatable layer, the first heatable layer being sandwiched between a first dielectric layer and a second dielectric layer, and the second heatable layer being sandwiched between the second dielectric layer and a third dielectric layer.

5. The glazing according to claim 4, wherein the integrated portion includes material of the third dielectric layer and the second heatable layer.

6. The glazing according to claim 4, wherein the integrated portion includes material of the first dielectric layer and the first heatable layer.

7. The glazing according to claim 4, wherein the integrated portion includes material of the first dielectric layer, the second dielectric layer, the third dielectric layer, the first heatable layer, and the second heatable layer.

8. The glazing according to claim 1, wherein the heatable layer contains silver.

9. The glazing according to claim 1, further comprising a second glass substrate laminated to the first glass substrate.

10. The glazing according to claim 1, wherein the differential heating area is an area for a wiper to rest upon the glazing when installed in a vehicle.

11. The glazing according to claim 1, wherein the differential heating area is a peripheral area of a camera opening area.

12. A method of providing a glazing with a heatable coating, comprising the steps of:

providing a first glass substrate formed with a heatable coating including at least one heatable layer and at least one dielectric layer;

forming an integrated portion of at least one of the at least one heatable layer and at least one of the at least one dielectric layer in a differential heating area; and providing a busbar formed on the heatable coating and located separate from the integrated portion.

13. The method according to claim 12, wherein the integrated portion is formed by applying a laser to the heatable coating.

14. The method according to claim 12, wherein the heatable coating includes a single heatable layer and first and second dielectric layers sandwiching the heatable layer, and the integrated portion is formed from the integration of the single heatable layer with either or both of the first and second dielectric layers.

15. The method according to claim 12, wherein the heatable coating includes first and second heatable layers and first to third dielectric layers, and wherein the integrated portion is formed from the integration of the first to third dielectric layers and the first and second heatable layers.

16. The method according to claim 12, further comprising a step of laminating the first glass substrate with a second glass substrate.

17. The method according to claim 12, further comprising the step of forming an opaque print on the heatable coating after the providing step of an integrated portion.

18. A laminated glazing comprising:

a first glass sheet having surfaces S1 and S2, wherein S1 faces an exterior when installed and a second glass sheet having surfaces S3 and S4, wherein S4 faces an interior when installed;

an interlayer provided between the first and second glass sheets;

a heatable coating formed on either of the first and second glass sheets, the heatable coating including a first heatable region and a second heatable region having a higher heating capability than that of the first heatable region, wherein the heatable coating includes at least one heatable layer, at least one dielectric layer and at least one integrated portion of at least one of the at least one heatable layer and at least one of the at least one dielectric layer, wherein the integrated portion is formed in the second heatable region;

a busbar supplying power to the heatable coating, the busbar formed on the heatable coating and located separate from the at least one integrated portion; and an opaque print formed on at least one of the first and second glass sheets, the opaque print hiding the busbar and the second heatable region when viewed from an exterior side of the first glass sheet.

19. The laminated glazing according to claim 18, wherein the second heatable region is arranged at a wiper park area.

20. The laminated glazing according to claim 18, wherein the heatable coating is removed to form a camera opening area, and wherein the second heatable region is formed at a peripheral area of the camera opening area.

\* \* \* \* \*